(12) United States Patent
Roebroeks et al.

(10) Patent No.: US 12,209,846 B2
(45) Date of Patent: Jan. 28, 2025

(54) BLAST PROTECTION PANEL

(71) Applicant: Nederlandse Organisatie voor toegepast-natuurwetenschappelijk onderzoek TNO, 's-Gravenhage (NL)

(72) Inventors: Gerardus Hubertus Joannes Joseph Roebroeks, Den Bommel (NL); Jan Hoogland, Edam (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 267 days.

(21) Appl. No.: 17/785,241

(22) PCT Filed: Dec. 16, 2020

(86) PCT No.: PCT/NL2020/050796
§ 371 (c)(1),
(2) Date: Jun. 14, 2022

(87) PCT Pub. No.: WO2021/125952
PCT Pub. Date: Jun. 24, 2021

(65) Prior Publication Data
US 2023/0041009 A1 Feb. 9, 2023

(30) Foreign Application Priority Data

Dec. 18, 2019 (EP) .................................... 19217545

(51) Int. Cl.
*F41H 5/04* (2006.01)
*B32B 5/02* (2006.01)
(Continued)

(52) U.S. Cl.
CPC .......... *F41H 5/0485* (2013.01); *B32B 5/024* (2013.01); *B32B 5/12* (2013.01); *B32B 5/263* (2021.05);
(Continued)

(58) Field of Classification Search
CPC .......... B32B 2262/101; B32B 2250/05; B32B 2260/023; B32B 5/12; B32B 2307/558; F41H 5/0485
(Continued)

(56) References Cited

U.S. PATENT DOCUMENTS

2010/0170021 A1* 7/2010 Van Es ................. F41H 5/0428
2/2.5
2011/0097021 A1* 4/2011 Curran ..................... A45F 3/06
190/125

(Continued)

FOREIGN PATENT DOCUMENTS

EP 0073648 3/1983
WO WO 89/01127 2/1989

OTHER PUBLICATIONS

European Patent Office, International Search Report in corresponding International Application No. PCT/NL2020/050796, dated Mar. 17, 2021 (2 pages).

*Primary Examiner* — Tri V Nguyen
(74) *Attorney, Agent, or Firm* — Leydig, Voit & Mayer, Ltd.

(57) ABSTRACT

In an aspect of the invention there is provided a blast protection panel, comprising a package of fibre-reinforced resin sheets, each sheet having a dominant unidirectional fibre orientation, said package of fibre-reinforced resin sheets formed in packed stacks, each stack comprising at least four fibre-reinforced resin sheets with dominant unidirectional fibres oriented, within said each stack, alternatingly at about right angles relative to each other; and said each stack packed against adjacent stacks, said adjacent stacks comprising sheets with dominant unidirectional fibres oriented at acute angles relative said each stack thereby forming a delamination interface.

20 Claims, 3 Drawing Sheets

(51) Int. Cl.
*B32B 5/12* (2006.01)
*B32B 5/26* (2006.01)

(52) U.S. Cl.
CPC ....... *B32B 2250/05* (2013.01); *B32B 2250/20* (2013.01); *B32B 2260/023* (2013.01); *B32B 2260/046* (2013.01); *B32B 2262/101* (2013.01); *B32B 2307/558* (2013.01); *B32B 2307/732* (2013.01); *B32B 2439/00* (2013.01)

(58) Field of Classification Search
USPC ...................................... 428/911, 113, 425.6
See application file for complete search history.

(56) References Cited

U.S. PATENT DOCUMENTS

| | | |
|---|---|---|
| 2012/0177872 A1 | 7/2012 | Tsai et al. |
| 2013/0219600 A1 | 8/2013 | Atorrasagasti et al. |
| 2016/0159034 A1* | 6/2016 | Bhatnagar ............... B32B 15/20 428/212 |
| 2022/0228840 A1* | 7/2022 | Citterio .................. B32B 5/022 |

* cited by examiner

BLAST PROTECTION PANEL

CROSS-REFERENCE TO RELATED APPLICATIONS

This patent application is a U.S. National Phase of PCT International Application No. PCT/NL2020/050796, filed Dec. 16, 2020, which claims priority to European Application No. 19217545.3, filed Dec. 18, 2019, which are both expressly incorporated by reference in their entireties, including any references contained therein.

FIELD

The present invention relates to a blast protection panel formed separately or integrally to a compartment, e.g. vehicle compartment, for protecting persons.

BACKGROUND

In modern defense operations, a desire exists to provide lightweight materials that are yet comparable or better in protective properties when protecting against a blast from e.g. an explosive device such as land mine or improvised explosive devices. Land-based military operations rely heavily on the safety, design and operational capabilities of military vehicles. Because of this, the aforementioned aspects are continuously optimized. The safety of a military vehicle is mainly determined by its ability to withstand threats such as ballistic impact of projectiles and fragments, as well as the structural response to blast loading of mines or IED's. Currently, military vehicles that can withstand a mine/IED blast are typically designed around an underbelly made of thick steel, sometimes with V-shaped form. Such blast protection measures add significant weight to a vehicle, therefore reducing its mobility and off-road capabilities.

Composite materials, e.g. materials comprising e.g. mixture of resin and (carbon/glass) fibres, and potentially metal sheets, are widely used in the aerospace, marine and automotive industry, where weight reduction, versus improved tensile strength of materials renders large gains. However, in the military, composite materials have yet to be developed that are sufficiently resistant against the extreme loads that develop e.g. during high impact situations, such as explosions. The material of choice there is typically steel or aluminum. The perfect trade-off for blast protection is reached when a more lightweight material with excellent blast resistant capability is used e.g. in a vehicle underbelly.

SUMMARY

In an aspect of the invention there is provided the features listed in claims 1. In particular, a blast protection panel comprises a package of fibre-reinforced resin sheets, each sheet having a dominant unidirectional fibre orientation, said package of fibre-reinforced resin sheets formed in packed stacks consisting of at least 4 sheets each stack comprising fibre-reinforced resin sheets with fibres oriented, within said each stack, alternatingly at about right angles relative to each other; and said each stack packed against an adjacent stack, said adjacent stacks comprising sheets with dominant unidirectional fibres oriented at acute angles relative said each stack thereby forming a delamination interface.

This structure has a better or comparable blast resistance at equal or lower weight and has further potential advantages in reduced back-face deformation; high impact energy absorption; improved formability manufacturability; improved corrosion resistance. The term "right angle" indicates an angle substantially perpendicular, but not excluding small deviations therefrom, e.g. in the order of plus or minus 10 degrees. An angle is measured as a smallest angle between 0-90 degrees, between unidirectional orientations of two intersecting fibre orientations. The term "acute angle" similarly indicates an angle about half of a right angle, so that the orientation of subsequent packed stacks is substantially mirror symmetrical.

BRIEF DESCRIPTION OF DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
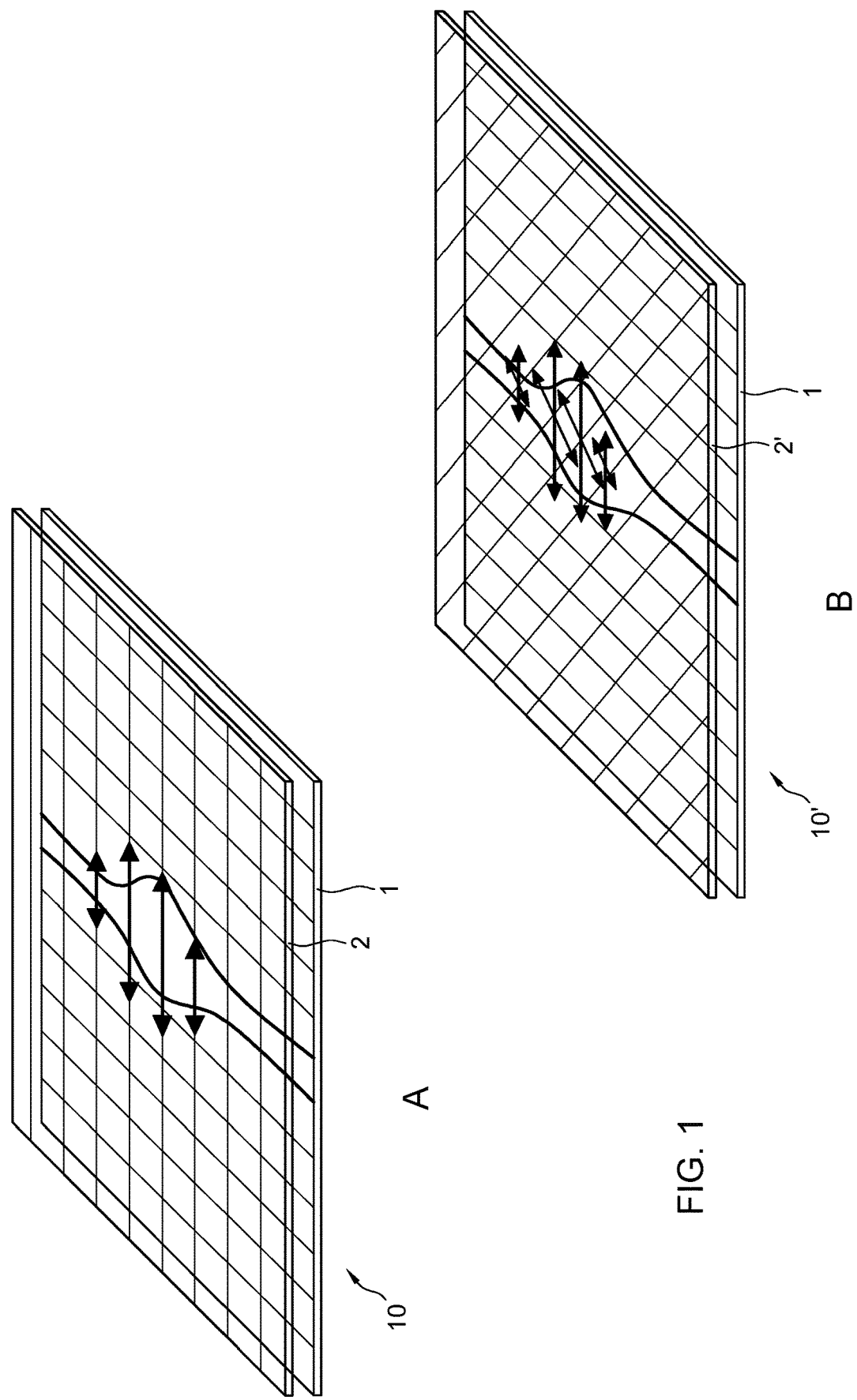
FIG. 1 (A+B) shows an schematic embodiment of a stack layout.

Military vehicles are designed to withstand serious impacts, e.g. of ballistic projectiles or explosions, e.g. of a mine below the vehicle. As a result, typically the vehicle is comprised of heavy and thick materials, to form doors, side walls and bottom walls of the vehicle, typically armor steel. This heavily impacts the weight of the vehicle which impacts mobility and versatility. A need exists to use lighter materials for blast and ballistic protection, resulting in better mobility characteristics at lower engine power, and lower required weight for e.g. the chassis, suspension, axes and transmission.

A composite material known as GLARE, is formed from thin glass fibre layers and aluminum layers. Other composites are usually based on carbon fibre or E-glass fibre. It is found that material and composite structure are leading properties for good resistance against blast impact (blast loading). Glass fibres have a unique property that tensile strength and strain to failure increase in relevant dynamic conditions. For instance, compared to a static stress test, strain to failure for S2-glass increases from about 4.5% to about 6.5%. In addition, in relevant (blast) pressure conditions, the strain to failure even further increases to about 9% with a tensile stress of 8000 MPa. Without being bound to theory, it is found that glass fibre composite materials that fail as a result of blast impact, experience a strain at failure (bending strain), at the backside of the panel, that is higher than a limit threshold. It is concluded that a high threshold for tensile strength is important. Or in other words, a high threshold for tensile strain is important for the panel to survive the small bending radius that may occur during blast loading. To resist high pressure blast conditions, it is found that the sheet thickness needs to be sufficient, which in testing resulted in sheet preferably from about 0.3 to 1.1 mm, or more particularly, at least about 0.5 mm. Such thickness of sheets results in timely delamination of the sheet materials, which enables an increased pressure load on the material and that improves its tensile strength properties. It will be understood that a sheet can be built up using multiple "sheet layers" or "layers", e.g. two or more sheet layers each comprising a fibre-reinforced resin and having a dominant unidirectional fibre orientation, e.g. as shown in the exemplary packages 3-6.

Furthermore, it is concluded that the use of unidirectional fibres is important for blast protection. Moreover, an important aspect, as presently disclosed is that, in addition to use of fibres having a high tensile strength and the use of relatively thick sheets of a unidirectional fibre orientation, the interface region between subsequent packed stacks of sheets is important.

Turning to FIG. 1A, it, is disclosed how a preferable orientation is of sheets within a packed stack 10 of two sheets 1, 2. In practice, the number of sheets is higher than 4. By way of example, it is shown how the packed stack 10 comprises fibre-reinforced resin sheets 1, 2 each with dominant unidirectional fibre orientations and stacked, within said each packed stack 10, alternatingly at about right angles relative to each other. In particular, in comparison with FIG. 1B, it is shown that stack 10' with sheets 1 and 2 differ from stack 10 in that in stack 10, sheet 2 is not oriented at a right angle but at an acute angle. From the comparison of both stacks 10, 10' it becomes clear that the first orientation 10 is beneficial for orienting, in an impact situation, as straight as possible, by having transversely oriented fibres at about right angles, keeping the side impact (transverse to the longitudinal direction) as low as possible.

Figure 2:
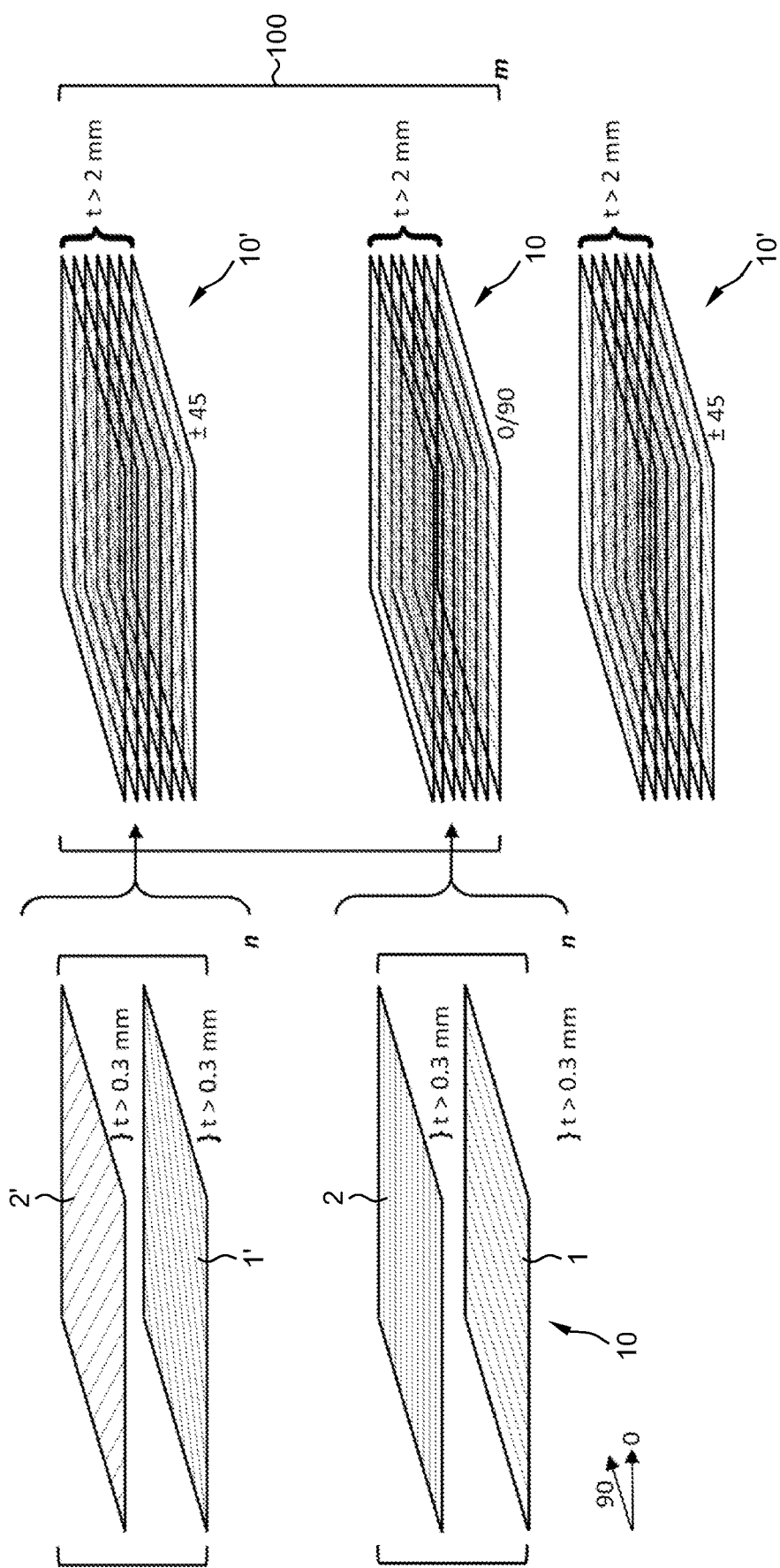
FIG. 2 shows a schematic embodiment of a package layout.

Going further, in FIG. 2, it is now shown how this principle of right-angled sheet layout is applied to gain a more quasi-isotropic stack layout of a cluster 100 of m packed stacks 10, 10'. For practical purposes the number m typically ranges about 5-20. Each stack 10, 10' comprises fibre-reinforced resin sheets 1,2, 1', 2' With dominant unidirectional fibres oriented, within said each stack 10, 10', alternatingly at about right angles relative to each other. The stacks 10, 10' have a thickness, larger than about 1.5 mm, preferably about 1-4 mm, preferably larger than 2 mm, accounting for a number of n sheets with n larger than 4, ranging about 4-25.

A cluster 100 of stacks is at least formed by a stack 10 having fibre-reinforced resin sheets 1,2, with dominant unidirectional fibres oriented, within said stack 10, alternatingly at about right angles relative to each other; and a stack 10' having fibre-reinforced resin sheets 1',2', with dominant unidirectional fibres also oriented, within said stack 10' alternatingly at about right angles relative to each other; wherein said each stack packed between adjacent stacks, said adjacent stacks comprising sheets with dominant unidirectional fibres oriented alternatingly at acute angles relative said each stack. These acute angles may vary between 35 and 55 degrees relative to a dominant length orientation in stack 10; more in particular, sheets 1', 2' in stack 10' are oriented at plus and minus 45 degrees relative to a dominant length orientation in stack 10; whereas sheets 1,2 in stack 10 are oriented at 0 and about 90 degrees, i.e. ranging between 80 and 100 degrees relative to a dominant length orientation.

In the embodiment of FIG. 2, sheets 1,2, 1', 2' are relatively thick, which means at least larger than 0.3 mm per sheet, in particular, about 0.3-1.5 mm, more specifically about 0.6 mm.

In particular, it is found that packed stacks of thick sheets are preferably stacked and said packed stacks comprising sheets with dominant unidirectional fibres are oriented, between subsequent packed stacks, alternatingly at an acute angle relative to each other, more particular at angles that are alternatingly plus and minus 45 degrees, for obtaining a quasi-isotropic fibre orientation. Thus a stack comprises fibre-reinforced resin sheets with dominant unidirectional fibres oriented, within said each packed stack, alternatingly at about right angles relative to each other (called a 0/90 degree orientation); and said packed stacks comprising sheets with dominant unidirectional fibres oriented, between subsequently stacked packed stacks, alternatingly at an acute angle relative to each other (called a +/− 45 degree orientation)

While, as explained with reference to FIG. 1, this lay-up in principal negatively impacts the 'quasi isotropic' characteristics of a stack of packed stacks, surprisingly it appeared that such a clustered packed stacking of the sheets in each packed stack yields a unique new composite material with quasi isotropic properties that is better suited for blast protection than a typical 0/90/−45+45 stacking arrangement (lay-up).

In particular, the sheets may be fabricated from main components, fibres and resin. The fibres are aligned in sheet material rolled onto rolls. When produced, the fibres, e.g. multiple S2 glass fibres bobbins positioned side by side are unwound and directed onto rolls, having a predetermined orientation. Subsequently, the fibres are rolled out onto or into a mould and said fibres are subsequently impregnated with resin, e.g. an epoxy resin and are processed under vacuum conditions, e.g. an autoclave.

Alternatively, pre-impregnated fibres may be used, obviating the impregnation step as herebefore described. After hardening, the composite sheet can be released from the mould and handled for further processing. Preferably, the fibre volume content is higher than 50% of the sheet volume. As another or further alternative it is envisioned to use materials or methods known from the composite industry. For example, the use of dry fiber layers with resin films that are alternatingly laminated to build a composite stack, and/or fiber layers that are attached to each other, e.g. by the fiber layer manufacturer, and that are directly laminated on top of each other, compressed, heated and thus cured to a fully impregnated and rigid laminate.

In an example, a stack is characterized by relative thick sheets (>0.3 mm) stacked in a pattern within a packed stack, alternatingly at about right angles relative to each other, to packed stacks of about more than 2 millimeters thickness. As an example, e.g. as shown with reference to the section describing exemplary packages, the lay-up within such a stack can be, but is not limited to, e.g. 0/90/0/90 (4 sheets) or −45/+45/−45/+45/−45/+45 (6 sheets).

Without being bound to theory, the inventive blast protection panel is designed so that impact leads to a timed delamination of the subsequent packed stacks, so that the bending stresses in the material are reduced. In combination with a high tensile strength, e.g. of S2 glass that withstands high dynamic loads, this provides blast protection properties that are comparable and better than steel alternative.

It will be understood that the panels, comprising fiber reinforced resin sheets, as disclosed herein process a certain level of stiffens/rigidity that allows the panels to be formed as flat or curved panels.

Advantageously, the panels as disclosed herein exhibit structural properties that allow the panel to be used as a structural, load bearing, construction element. For example, to be formed separately or integrally to a compartment (e.g. vehicle compartment), while offering blast protection.

For daily load conditions, e.g. such as experienced during regular operations of a structure comprising the panel, such as a vehicle driving over roads, bumpy roads or off-road/ rough terrain, the total laminate composition behaves similar to regular full composites, stiff and rigid. Delamination occurs at the event of an impact, e.g. a blast load, so as to mitigate panel failure due to potential critical bending stress at the hack side of the laminate. As explained earlier, delamination occurs preferably at the interfaces of the stacks, so that many sheet interfaces remain intact. This prevents the blast pressure to search its route through the laminate thickness which mitigates exposing the vehicle interior to high pressures. By this timely but selective delamination, the laminate thus changes its character at critical impact loads, from a rigid fiber reinforced laminate with all the benefits of such materials, to flex under a local impact load, preventing the laminate to experience high bending strain, thus preventing early layer failure as regularly occurs for fiber reinforced composites that are not build-up as described herein.

In a preferred embodiment, the sheets (and thus the stacks) are bonded together, e.g. using a resin system, to form an integral package. Thus, the package can advantageously serve as structural construction element (e.g. a stiff panel arranged to carry typical structural loads under normal conditions) while at the same time offering blast protection (e.g. as described herein for a vehicle).

Preferably, the sheets, stacks, and package are essentially completely impregnated with resin, forming an integrally bonded panel wherein essentially no fibers or fiber layers are left loosely bonded or not bonded at all, which would make the material less suitable to carry structural loads.

As such the blast protection panel according to the invention can be understood to provide, under normal condictiones, structural properties and behavior similar to regular fully impregnated fiber reinforced composite materials (comparable rigidity, stiffness, strength, weight) but, due to its distance internal structure, displays an internal structure displaying mainly stacks that are delaminated from adjacent stacks due to a local impact/blast. Thereby preventing the build-up of high bending stress/strain, thus delaying layer failure and mitigating overall panel failure.

Going forward, some embodiments will be described of the principle as illustrated hereabove with reference to FIG. 2.

Package 1: 0/90/−45/+45/+45/−45/90/0 or
Package 2: 0/90/−45/+45/0/90/−45/+45/+45/−45/90/0/+45/−45/90/0 (underlined sheets denote the middle of the package).

These packages are characterized by a symmetric composition, i.e. going inward outer stacks are each stacked in corresponding same orientations from both sides of the panel. Furthermore, the number of 0/90 and +45/−45 stacks are the same; in Material 1 in 2 and 2 sheet layers respectively and in Material 2 in 4 and 4. sheet layers respectively. As indicated material 1 comprises two 0/90 and two +45/−45 stacks and material 2 comprises four 0/90 and four +45/−45 stacks. The stack interfaces having fiber orientations in acute angles is evenly distributed through the package. In the materials, the stacks each have a thickness of about 0.9-1.1 mm. However, in the example packages, not every and each stack comprises at least four fibre-reinforced resin sheets with fibres oriented, within said each stack, alternatingly at about right angles relative to each other; since in Package 1 stacks are formed of two sheets each and in Package 2 only one stack has at least four sheets (Package 2, middle stack)

Package 3: +45/+45/+45/0/0/0/90/90/90/−45/−45/−45/+45+45/+45/0/0/0/90/90/90/−45/−45/−45/+45/0/90/−45/−45−45/−45/90/90/90/0/0/0/+45/+45/+45//−45−45/−45/90/90/90/0/0/0/+45/+45/+45/(underlined sheets denote the middle of the package).

The short-handed lay-up is as follows
+45³/0³/90³/−45³/+45³/0³/90³/−45³/+45¹/0¹/90¹/−45¹/−45³/90³/0³/+45³/−45³/90³/0³/+45³

The number of sheets in each stack is still smaller than four.

The sheets in the stack are about 0.9 mm and are nicely delaminating in the blast (over the sheet interfaces during blast loading), which is the desired effect.

However it is more desirable that the sheets within the stack are not delaminated, but that the stacks are delaminated on adjacent interfaces (i.e. that delamination is especially at the stack interfaces). When delaminating on sheet level, a propagation path can be formed for the blast, through delaminating sheets, which happens especially when sheets are oriented at acute angles relative to each other. This effect can be mitigated by providing clusters of stacks (multiple stacks), each stack having a 0/9 orientation or a +45/−45 orientation; wherein the stacks are clustered to a stack thickness of at least four sheets in a stack.

Package 4: +45²/−45²/+45²/−45²/+45²/−45²/0²/90²/0²/90²/0²/90²/0¹/90²/0¹//90²/0²/90²/0²/90²/0²/−45²/+45²/−45²/+45²/−45²/+45²

In this packages a first stack of 12 sheet layers is formed having a +45/−45 orientation. Then a stack of 28 sheet layers is formed having 0/90 fiber orientation and then, another 12 sheet layers having −45/+45 fiber orientation. Thus forming a package having a total of three stacks, each having six sheets, each sheet comprised of two sheet layers). In this package there are only a limited number of interfaces (only two) where the fiber orientation is at acute angles which reduces the number of interfaces where delamination takes place. The outer sides of the package, (+45/−45 stacks) will deform in another direction than the central 0/90 stack. Only two interfaces having acute angles relative to adjacent stacks will be loaded between three stacks. These two interfaces will be most sensitive to delamination. Conversely, the stacks within the packages will not exhibit, or exhibit reduced, internal delamination interfaces, due to the right angle orientation of the at least four sheets within the stack. Preferably, the sheet thickness are selected in a range of about 0.6 mm, and the stacks may be about 3 mm, for a total thickness of the package of about 15 mm.

Thus, in total a package of 52 sheet layers (27 sheets) is provided to a thickness of about 15 mm having excellent blast resistant properties.

In a sealed up version a package can be cluster eel 5 stacks, instead of 3 as earlier described.
Package 5:

| | | |
|---|---|---|
| +45/−45: | 12 sheet layers | thickness = 3.6 mm |
| 0/90: | 18 sheet layers | thickness = 5.5 mm |
| +45/−45: | 12 sheet layers | thickness = 3.6 mm |
| 0/90: | 18 sheet layers | thickness = 5.5 mm |
| +45/−45: | 12 sheet layers | thickness = 3.6 mm |

In total 72 sheet layers (36 sheets; 5 stacks) having a thickness of about 22 mm
Package 6 has following stack layup:
+45³/0³/90³/−45³/+45³/0³/90³/−45³/+45³/0³/90³/−45³−45³/90³/0³/+45³/−45³/90³/0³/+45³/−45³/90³/0³/+45³

Here the number of interfaces having acute angles is increased relativrelative to package 5. It is found that Package 5 performs better than Package 6.

In a further scaled-up package a stack layout may be

| | | |
|---|---|---|
| +45/−45: | 12 sheet layers | thickness = 3.6 mm |
| 0/90: | 12 sheet layers | thickness = 3.6 mm |
| +45/−45: | 12 sheet layers | thickness = 3.6 mm |
| 0/90: | 16 sheet layers | thickness = 5 mm |
| +45/−45: | 12 sheet layers | thickness = 3.6 mm |

-continued

| | | |
|---|---|---|
| 0/90: | 16 sheet layers | thickness = 5 mm |
| +45/−45: | 12 sheet layers | thickness = 3.6 mm |
| 0/90: | 16 sheet layers | thickness = 5 mm |
| +45Z−45: | 12 sheet layers | thickness = 3.6 mm |
| 0/90: | 12 sheet layers | thickness = 3.6 mm |
| +45/−45: | 12 sheet layers | thickness = 3.6 mm |

In total 144 sheet layers having a thickness of about 44 mm.

Figure 3:
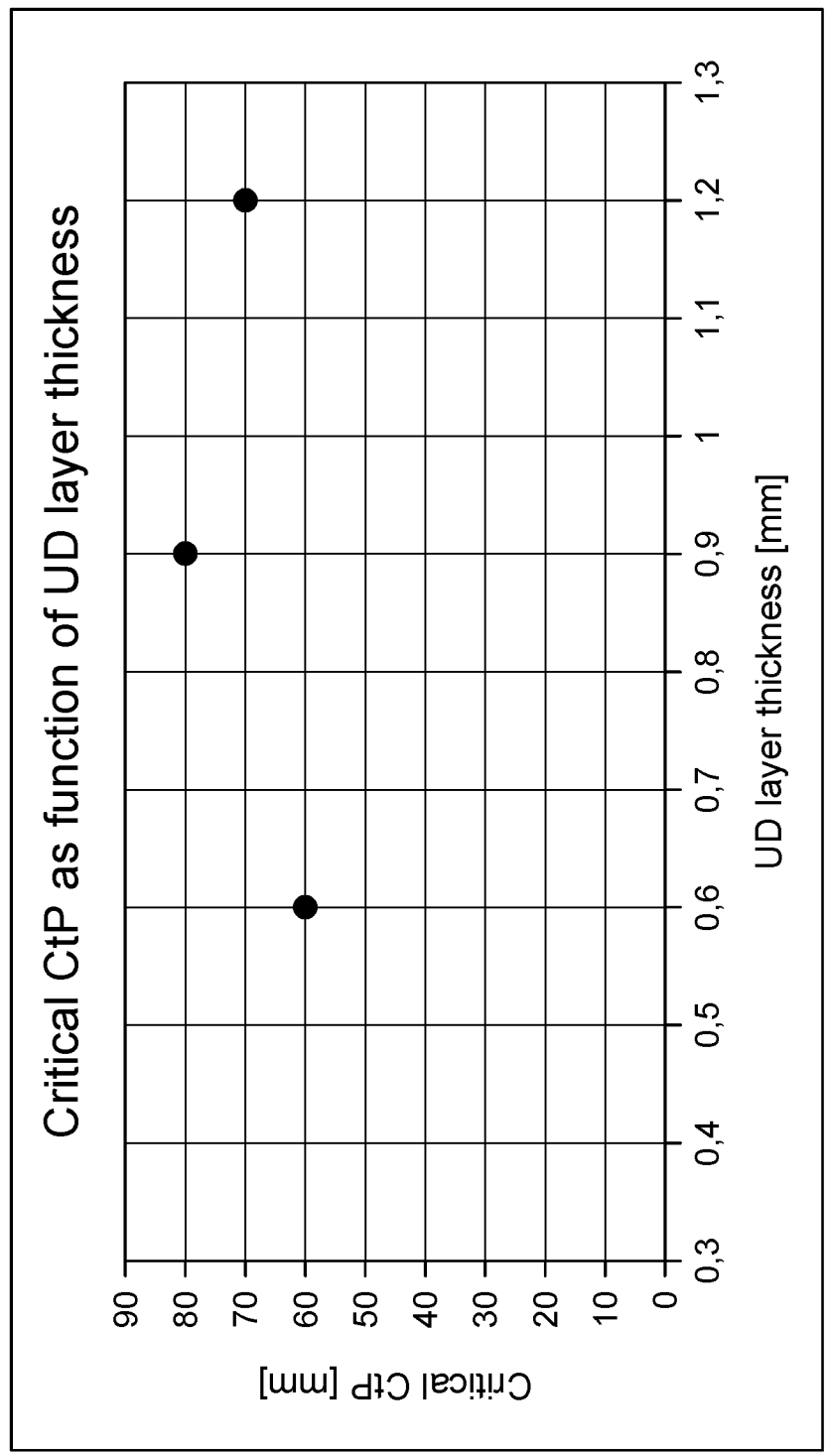
FIG. 3 shows a graph of a blast results related to sheet layer thickness.

In FIG. 3, a graph is shown of blast results related to sheet layer thickness. The graph shows for sheet layer thickness a critical distance relative to a standard blast load. It is found that a sheet thickness of 0.6 mm yields better results, as the critical distance is 60 mm, relative to a thickness of 0.9 mm, having a critical distance of 80 mm meaning that the package is destroyed at closer ranges.

Comparative Example

A test is conducted with three types of panels:
  A series of aluminium-5083 panels with a thickness of 10 mm.
  A series of T300-carbon weave/PEI resin panels with a thickness of 15 mm
  A series of E-glass weave/PEI resin panels with a thickness of 15 mm.
  All samples are tested with the 188 g Semtex explosive charge, positioned at varying distances between the charge face and the panel face. The charge is placed on a massive steel backing plate (thickness>5 cm). The panels themselves are supported by an overdimensioned thick steel plate featuring a circular hole, through which the panel bulges inward under the effect of the applied blast, pressure. The results can be found in Table 2.

TABLE 2

Strain and displacement results for aluminum panels, and carbon fibre and E-glass based composites.

| Panel type | Charge-to-panel [mm] | Max. strain | Panel intact |
|---|---|---|---|
| 15 mm, flat | 640 | 1% at failure | No |
| T-300 carbon/PEI | 440 | 1.2% at failure | No |
| | 240 | 0.9% at failure | No |
| 15 mm, flat | 240 | 3% | Cracked |
| E-glass/PEI | 240 | 3% | Cracked |
| | 160 | 3% at failure | No |
| 10 mm, flat Al-5083 | 100 | 19% | Yes |

From the data in the table, it becomes clear that nor carbon fibre-based nor E-glass composites using PEI resin could match the performance of e.g. aluminium. The maximum strain level in the carbon fibre-based composite would reach just 1.2% before failing, already at large charge-to-panel distance. In an video analysis it becomes apparent that failure occurs during the very first instance of panel deformation. At this early stage, the blast pressure only affects a small region at the center of the panel, resulting in significant local bending. Caibon fibre does not possess the necessary strain-to-failure to accommodate this local initial panel bending, and there is little help from strain rate effects, nor from delamination between layers or sheets.

For the E-glass based composites, better results were obtained. From high-speed video analysis it can be observed that the critical deformation resulting in exceedance of the strain to failure due to local bending is significantly increased, yet it is still significantly lower than for aluminium. The E-glass based composite also doesn't show delamination during blast loading, similar as the carbon-based composite. Although E-glass is weaker (has a lower tensile strength) than carbon fibre, E-glass has a higher strain to failure, which may explain its comparatively better performance.

Without being bound to theory, it is believed that the use of weave-like fibres, such as the carbon and E-glass used in this experiments, will lead to stress concentrations at the overlap points between fibres (reducing strain-to-failure), and as a result it is to believed that the use of unidirectional (UD) fibre layers is beneficial Unless otherwise defined, all terms (including technical and scientific terms) used herein have the same meaning as commonly understood by one of ordinary skill in the art to which this disclosure belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be further understood that the terms "comprises" and/or "comprising" specify the presence of stated features but do not preclude the presence or addition of one or more other features. All publications, patent applications, patents, and other references mentioned herein are incorporated by reference in their entirety. In case of conflict, the present specification, including definitions, will control.

While example embodiments were shown for systems and methods, also alternative ways may be envisaged by those skilled in the art having the benefit of the present disclosure for achieving a similar function and result. E.g. some components may be combined or split up into one or more alternative components.

It is not excluded that the delamination interfaces are provided by acute angles differing from 45 degrees. In practical embodiments, depending on purpose, the numbers of sheets and stacks may vary, and the invention is not limited to the disclosed examples. The sheets may also vary in thickness. Also, further composites may be formed including metal layers and/or composites using fibers such as E-glass.

For example, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the scope of the present systems and methods as set forth in the claims that follow. The specifications and drawings are accordingly to be regarded in an illustrative manner and are not intended to limit the scope of the appended claims.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage.

The invention claimed is:

1. A blast protection panel, comprising a package of fiber-reinforced resin sheets,
   wherein each sheet of the package of fiber-reinforced resin sheets has a dominant unidirectional fiber orientation,
   wherein the package of fiber-reinforced resin sheets is formed of a plurality of packed stacks,
   wherein each packed stack of the plurality of packed stacks comprises at least four fiber-reinforced resin sheets with the dominant unidirectional fiber orientation of a sheet of the packed stack being rotated at about a right angle relative to the dominant unidirectional fiber orientation of an adjacent sheet of the packed stack;
   wherein each packed stack of the package is packed against an adjacent packed stack of the plurality of packed stacks, and
   wherein adjacent sheets, of each of two adjacent packed stacks of the plurality of packed stacks, have a dominant unidirectional fiber orientation rotated at an acute angle relative to each other, thereby forming a delamination interface between adjacent stacks of the plurality of packet stacks.

2. The blast protection panel according to claim 1, wherein the blast protection panel is formed integrally with or attached to a compartment.

3. The blast protection panel according to claim 1, wherein the about right angles relative to each other includes a range of between 80 and 100 degrees.

4. The blast protection panel according to claim 1, wherein the acute angle is in a range of between 30 and 60 degrees.

5. The blast protection panel according to claim 1, wherein the blast protection panel is curved.

6. The blast protection panel according to claim 1, wherein a stack, of the plurality of packed stacks, measures a packed stack thickness in a range of between 1-4 mm.

7. The blast protection panel according to claim 1, wherein a sheet measures a sheet thickness in a range of between 0.3-1.5 mm.

8. The blast protection panel according to claim 1, wherein a number of sheets within each stack, which have fibers that are oriented within the each stack alternatingly at about right angles relative to each other, ranges between 4 and 25 sheets.

9. The blast protection panel according to claim 1, wherein a number of stacks of fiber-reinforced resin sheets formed in packed stacks in the package is in a range of 3 to 30 stacks.

10. The blast protection panel according to claim 1, wherein the fibers are glass fiber.

11. The blast protection panel according to claim 1, wherein the fibers have a volume in sheet that is higher than 50% of sheet volume.

12. The blast protection panel according to claim 1, wherein the panel has a thickness in a range of between 1-6 cm.

13. The blast protection panel according to claim 1, wherein the panel has a thickness in a range of between 2-4 cm.

14. The blast protection panel according to claim 1, wherein the acute angle is in a range of between 40 and 50 degrees.

15. The blast protection panel according to claim 1, wherein the blast protection panel is shaped as a non-flat panel.

16. The blast protection panel according to claim 1, wherein a stack, of the plurality of packed stacks, measures a packed stack thickness of about 2 mm.

17. The blast protection panel according to claim 1, wherein a sheet measures a sheet thickness of about 0.6 mm.

18. The blast protection panel according to claim 1, wherein the number of stacks of fiber-reinforced resin sheets formed in packed stacks in the package is in a range from 5 to 15 stacks.

19. The blast protection panel according to claim 1, wherein the fibers are S-glass.

20. The blast protection panel according to claim 1, wherein the fibers are S2 glass.

* * * * *